US012658025B2

(12) United States Patent
Sekioka

(10) Patent No.: US 12,658,025 B2
(45) Date of Patent: Jun. 16, 2026

(54) OBSERVATION SYSTEM

(71) Applicant: Hidehiko Sekioka, Fukuoka (JP)

(72) Inventor: Hidehiko Sekioka, Fukuoka (JP)

(73) Assignee: Hidehiko Sekioka, Fukuoka (JP)

( * ) Notice: Subject to any disclaimer, the term of this patent is extended or adjusted under 35 U.S.C. 154(b) by 0 days.

(21) Appl. No.: 18/565,083

(22) PCT Filed: Feb. 22, 2022

(86) PCT No.: PCT/JP2022/007350

§ 371 (c)(1),
(2) Date: Nov. 29, 2023

(87) PCT Pub. No.: WO2023/127170

PCT Pub. Date: Jul. 6, 2023

(65) Prior Publication Data

US 2024/0312336 A1 Sep. 19, 2024

(30) Foreign Application Priority Data

Dec. 28, 2021 (JP) ................................ 2021-215143

(51) Int. Cl.
*G08B 29/18* (2006.01)
*G08B 25/00* (2006.01)

(52) U.S. Cl.
CPC ......... *G08B 29/181* (2013.01); *G08B 25/009* (2013.01)

(58) Field of Classification Search
CPC ............................ G08B 29/181; G08B 25/009
See application file for complete search history.

(56) References Cited

U.S. PATENT DOCUMENTS

| | | | | |
|---|---|---|---|---|
| 4,928,099 A * | 5/1990 | Drake | G08B 25/009 379/49 |
| 6,624,750 B1 * | 9/2003 | Marman | G08B 25/10 340/521 |
| 8,610,377 B2 * | 12/2013 | Chemel | H05B 47/155 315/318 |
| 8,653,965 B1 * | 2/2014 | Otto | A61B 5/0015 340/286.07 |
| 8,957,757 B1 * | 2/2015 | Le Burge | H04L 63/0846 340/5.6 |
| 10,488,910 B1 * | 11/2019 | Cannell | H04W 4/20 |
| 10,983,579 B2 * | 4/2021 | Cannell | H04W 4/20 |

(Continued)

FOREIGN PATENT DOCUMENTS

| | | |
|---|---|---|
| CN | 103637777 | 3/2014 |
| CN | 107708095 | 2/2018 |

(Continued)

OTHER PUBLICATIONS

"International Search Report (Form PCT/ISA/210) of PCT/JP2022/007350", mailed on Apr. 26, 2022, with English translation thereof, pp. 1-4.

*Primary Examiner* — Hoi C Lau
(74) *Attorney, Agent, or Firm* — JCIPRNET

(57) ABSTRACT

An observation system is provided. The monitoring-band observation system is formed by a monitoring band 1, a smartphone 2, and a server 3. A monitored target and a monitoring person are alerted under the condition that the remaining battery capacity of the monitoring band 1 or the smartphone 2 is equal to or less than a predetermined reference value.

3 Claims, 16 Drawing Sheets

(56) References Cited

U.S. PATENT DOCUMENTS

| | | | | |
|---|---|---|---|---|
| 2005/0047382 | A1* | 3/2005 | Park | H04W 52/0216 370/338 |
| 2005/0096094 | A1* | 5/2005 | Kim | H04W 24/00 455/566 |
| 2005/0272408 | A1* | 12/2005 | Wilkes-Gibbs | H04M 1/72457 455/412.2 |
| 2006/0009191 | A1* | 1/2006 | Malone, III | H04W 4/90 455/11.1 |
| 2006/0099969 | A1* | 5/2006 | Staton | G08B 21/0283 455/456.4 |
| 2006/0109107 | A1* | 5/2006 | Staton | G01C 21/26 340/8.1 |
| 2006/0220843 | A1* | 10/2006 | Broad | G08B 25/10 340/539.23 |
| 2006/0226990 | A1* | 10/2006 | Broad | G06Q 20/203 340/5.91 |
| 2006/0229086 | A1* | 10/2006 | Broad | G08B 25/009 455/423 |
| 2007/0106124 | A1* | 5/2007 | Kuriyama | G08B 21/0211 600/300 |
| 2007/0132846 | A1* | 6/2007 | Broad | G08B 25/009 348/143 |
| 2008/0088438 | A1* | 4/2008 | Aninye | G08B 21/0286 340/539.13 |
| 2009/0045922 | A1* | 2/2009 | Kosecki | G06F 8/65 340/10.3 |
| 2009/0270120 | A1* | 10/2009 | Park | H04W 72/30 455/518 |
| 2010/0013933 | A1* | 1/2010 | Broad | G08B 25/10 348/E7.085 |
| 2010/0141461 | A1* | 6/2010 | Morita | G08B 17/00 340/636.15 |
| 2011/0054334 | A1* | 3/2011 | Fischell | A61N 1/37258 600/509 |
| 2012/0032844 | A1* | 2/2012 | Mo | G01S 5/0027 342/357.46 |
| 2014/0085061 | A1* | 3/2014 | Shimizu | H04M 1/72415 340/12.5 |
| 2016/0140829 | A1* | 5/2016 | Romanoff | G06Q 10/06 340/540 |
| 2019/0377399 | A1* | 12/2019 | Cannell | H04W 52/0261 |
| 2020/0089303 | A1* | 3/2020 | Cannell | H04W 52/0261 |
| 2022/0386293 | A1* | 12/2022 | Anezaki | H04L 41/12 |
| 2023/0016774 | A1* | 1/2023 | Link, II | G01S 11/06 |
| 2024/0267113 | A1* | 8/2024 | Dees | H04W 88/06 |
| 2024/0284352 | A1* | 8/2024 | Takizawa | H04B 7/15535 |
| 2024/0312336 | A1* | 9/2024 | Sekioka | G08B 29/181 |
| 2025/0071517 | A1* | 2/2025 | Sekioka | H04W 40/12 |

FOREIGN PATENT DOCUMENTS

| | | |
|---|---|---|
| CN | 109151736 | 1/2019 |
| JP | 2002099971 | 4/2002 |
| JP | 2016001433 | 1/2016 |
| JP | 2018157289 | 10/2018 |
| JP | 2018206112 | 12/2018 |
| JP | 2020088463 | 6/2020 |
| JP | 2021096828 | 6/2021 |

* cited by examiner

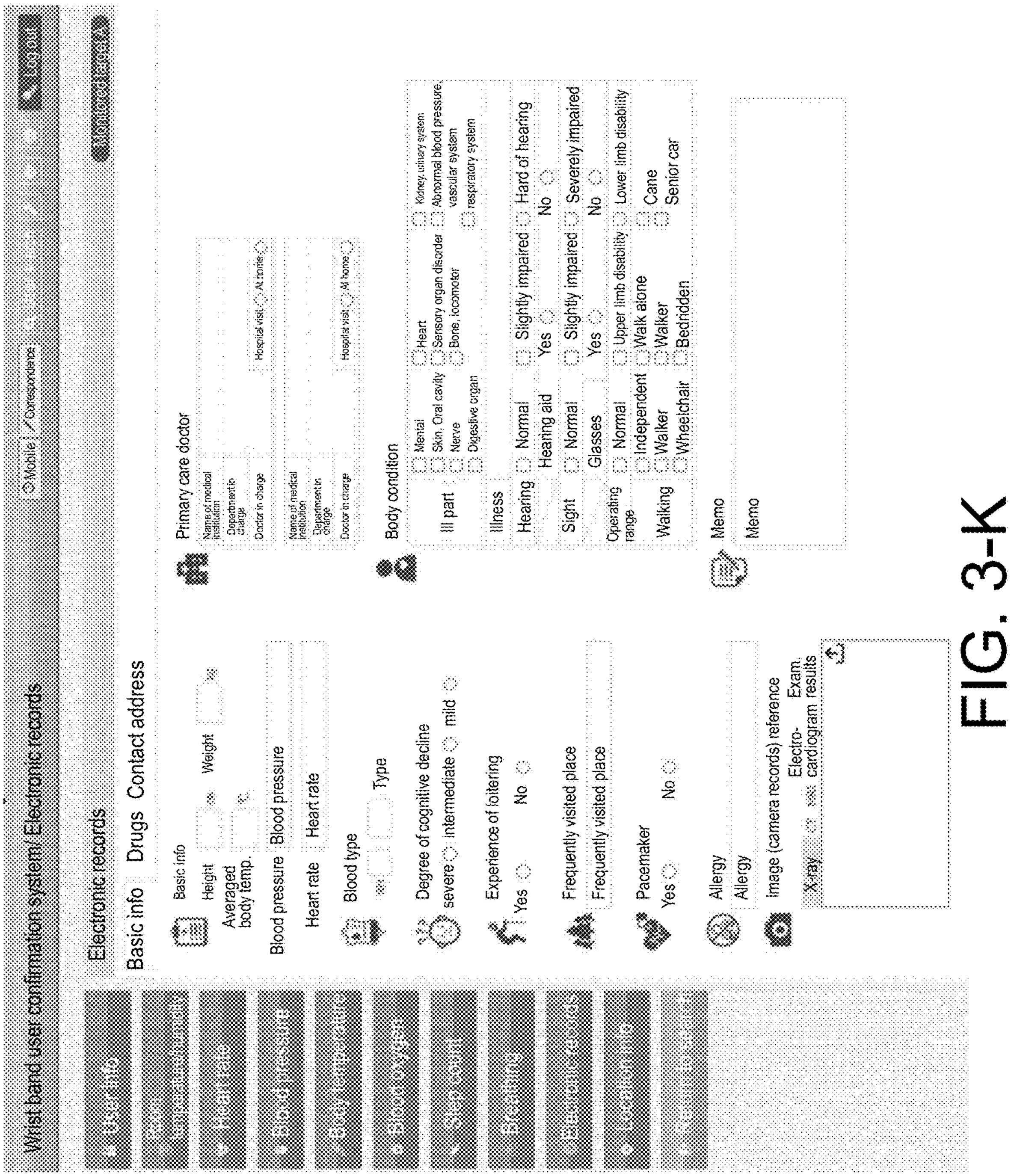
FIG. 3-K

OBSERVATION SYSTEM

CROSS-REFERENCE TO RELATED APPLICATION

This application is a 371 application of the International PCT application serial no. PCT/JP2022/007350, filed on Feb. 22, 2022, which claims the priority benefits of Japan Patent Application No. 2021-215143, filed on Dec. 28, 2021. The entirety of each of the above-mentioned patent applications is hereby incorporated by reference herein and made a part of this specification.

TECHNICAL FIELD

The invention relates to an observation system and an observation program. More specifically, the invention relates to an observation system and an observation program able to more sufficiently realize suitable monitoring.

RELATED ART

A monitoring band can make contribution to the society, such as avoiding elderly people from dying alone, tracking the trajectory of loitering elderly people to ensure their safety, etc., by suitably utilizing various information collected by the monitoring band.

Therefore, inventors of the invention have proposed a technique for realizing suitable monitoring band observation (see Patent Document 1).

CITATION LIST

Patent Literature

[Patent Literature 1] Japanese Laid-open No. 2021-96828

SUMMARY OF INVENTION

Technical Problem

Meanwhile, there are various observation targets monitored by monitoring bands, and the situations of the observation targets vary. Therefore, with only the technique disclosed in Patent Document 1, suitable monitoring may not be sufficiently realized.

The invention has been made in view of the foregoing, and an objective of the invention is to provide an observation system and an observation program capable of more sufficiently realizing suitable monitoring.

Solution to Problem

In order to achieve the objective, an observation system of the invention includes a predetermined apparatus, a server, and a relay device that is portable and relays communication between the apparatus and the server. The apparatus has: a detection part, obtaining predetermined observation information from an observation target to which the apparatus is mounted; and an apparatus information transmission part, transmitting the observation information obtained by the detection part and remaining battery capacity information of the apparatus to the relay device. The relay device has: a relay part, receiving transmission data from the apparatus and the server and respectively transmitting the transmission data to the server and the apparatus; a relay device information transmission part, transmitting remaining battery capacity information of the relay device to the sever; and an identification part, identifying, based on an apparatus identifier indicating the apparatus and for each of multiple apparatuses of different models, a model of the apparatus transmitting the observation information, and identifying, based on a machine learning model, which observation information in the observation system the observation information received from the apparatus corresponds to. The server has a control signal transmission part transmitting a control signal controlling the apparatus to the apparatus via the relay device, and is configured to be able to display on a management screen that a remaining battery capacity is insufficient under a condition that a remaining battery capacity of the apparatus or a remaining battery capacity of the relay device is equal to or less than a predetermined reference value.

In addition, an observation system of the invention includes a relay device that is portable and relays communication between a predetermined apparatus and a server. Transmission data received by the relay device from the apparatus includes predetermined observation information obtained from an observation target to which the apparatus is mounted and remaining battery capacity information of the apparatus. Transmission data received by the relay device from the server includes a control signal controlling the apparatus. The relay device has: a relay part, receiving transmission data from the apparatus and the server and respectively transmitting the transmission data to the server and the apparatus; a relay device information transmission part, transmitting remaining battery capacity information of the relay device to the sever; and an identification part, identifying, based on an apparatus identifier indicating the apparatus and for each of multiple apparatuses of different models, a model of the apparatus transmitting the observation information, and identifying, based on a machine learning model, which observation information in the observation system the observation information received from the apparatus corresponds to. The server is configured to be able to transmit a remaining battery capacity of the apparatus and a remaining battery capacity of the relay device to the server to display on a management screen that a remaining battery capacity is insufficient under a condition that the remaining battery capacity of the apparatus or the remaining battery capacity of the relay device is equal to or less than a predetermined reference value.

In addition, an observation system of the invention includes a server communicating with a predetermined apparatus via a portable relay device. Transmission data received by the server from the relay device includes predetermined observation information obtained from an observation target to which the apparatus is mounted, remaining battery capacity information of the apparatus, and remaining battery capacity information of the relay device. Transmission data transmitted by the server to the relay device includes a control signal controlling the apparatus. The server receives the transmission data from the relay device, and the relay device includes: a relay part, receiving transmission data from the apparatus and the server and respectively transmitting the transmission data to the server and the apparatus; a relay device information transmission part, transmitting remaining battery capacity information of the relay device to the sever; and an identification part, identifying, based on an apparatus identifier indicating the apparatus and for each of multiple of apparatuses of different models, a model of the apparatus transmitting the observation information, and identifying, based on a machine learning model, which observation information in the observation system the observation information received from the apparatus corresponds to. The server is configured to be able to display on a management screen that a remaining battery capacity is insufficient under a condition that a remaining battery capacity of the apparatus or a remaining battery capacity of the relay device is equal to or less than a predetermined reference value.

Moreover, in order to achieve the objective, an observation program for causing a portable information apparatus to function as a relay device. The relay device relays communication between a predetermined apparatus and a server, receives transmission data including predetermined observation data obtained from an observation target to which the apparatus is mounted from the apparatus and receives transmission data including a control signal controlling the apparatus from the server. The relay device has: a relay part, receiving transmission data from the apparatus and the server and respectively transmitting the transmission data to the server and the apparatus; a relay device information transmission part, transmitting remaining battery capacity information of the relay device to the sever; and an identification part, identifying, based on an apparatus identifier indicating the apparatus and for each of multiple apparatuses of different models, a model of the apparatus transmitting the observation information, and identifying, based on a machine learning model, which observation information in the observation system the observation information received from the apparatus corresponds to. The server is configured to be able to transmit a remaining battery capacity of the apparatus and a remaining battery capacity of the relay device to the server to display on a management screen that a remaining battery capacity is insufficient under a condition that the remaining battery capacity of the apparatus or the remaining battery capacity of the relay device is equal to or less than a predetermined reference value.

Here, with the apparatus being provided with the apparatus information transmission part, the observation information obtained by the detection part can be transmitted to the relay device. In addition, the observation information transmitted to the relay device is transmitted to the server by the relay part to be described afterwards. Therefore, the observation information can be monitored by the server.

Likewise, with the apparatus being provided with the apparatus information transmission part, the remaining battery capacity information of the apparatus can be transmitted to the relay device. In addition, the remaining battery capacity information of the apparatus transmitted to the relay device is transmitted to the server via the relay part to be described afterwards. Therefore, the remaining battery capacity information of the apparatus can be monitored by the server.

In addition, with the relay device being configured to be portable, compared with the case where the relay device is not portable (e.g., the case where a beacon terminal is provided at a specific location), the area in which the communication between the apparatus and the server can be relayed is expanded, and the area in which the observation information of the observation target can be monitored is expanded.

In addition, examples of “portable relay device” include electronic apparatuses such as a smartphone, a tablet, a laptop.

In addition, with the relay device being provided with the relay part, the transmission data from the apparatus and the server can be received and respectively transmitted to the server and the apparatus, thereby realizing information exchange between the apparatus and the server.

Although it is technically possible to exchange information directly between the apparatus and the server without transmission via the relay device, in the case where the relay device is not interposed, the apparatus will take the role of the relay device, making it difficult to reduce the size and the weight of the apparatus. Therefore, in the invention, by adopting the configuration of exchanging information indirectly between the apparatus and the server via the relay device, the size as well the weight of the apparatus are reduced.

Moreover, with the relay device being provided with the relay device information transmission part, the remaining battery capacity information of the relay device can be transmitted to the server, and the remaining battery capacity information of the relay device can be monitored by the server.

In addition, with the relay device being provided with the identification part, based on the apparatus identifier for each of multiple apparatuses of different models, the model of the apparatus transmitting the observation information can be identified, and, based on a machine learning model, which observation information in the observation system the observation information received from the apparatus corresponds to can be identified. Therefore, a versatile system is realized. For example, even in the case where the apparatus mounted by (or mounted to) the observation target is replaced, it is possible to take action such as transmitting to the observation information to the server after performing data formatting to match the model mounted by (or mounted to) the observation target.

In addition, with the server being provided with the control signal transmission part, the control signal controlling the apparatus can be transmitted to the apparatus via the relay device, and the apparatus can be controlled from the server in accordance with the observation contents with respect to the observation target.

Moreover, with the configuration that is possible to display on the management screen that the remaining battery capacity is insufficient under the condition that the remaining battery capacity of the apparatus or the remaining battery capacity of the relay device is equal to or less than the predetermined reference value, the possibility of the situation that the relay device and the apparatus are not connectible with each other (the situation of being unable to observe) can be visually grasped through the management screen.

In addition, in the case where it is configured to be able to transmit a caution signal indicating that the remaining battery capacity is insufficient to the apparatus under the condition that the remaining battery capacity of the apparatus or the remaining battery capacity of the relay device is equal to or less than the predetermined reference value, the attention of the observation target to which the apparatus is mounted can be drawn.

Likewise, in the case where it is configured to be able to transmit a caution signal indicating that the remaining battery capacity is insufficient to the relay device under the condition that the remaining battery capacity of the apparatus or the remaining battery capacity of the relay device is equal to or less than the predetermined reference value, the attention of the person carrying the relay device can be drawn.

“The person carrying the relay device” may be the observation target, and may also be a person other than the observation target.

In addition, in the case where the server is configured to be able to transmit, to the relay device, an apparatus stop signal indicating that the remaining battery capacity of the apparatus is substantially zero under the condition that the remaining battery capacity of the apparatus is substantially zero, the person carrying the relay device can be notified of the situation where the relay device and the apparatus are not connectible with each other (the situation of being unable to observe).

"The person carrying the relay device" may be the observation target, and may also be a person other than the observation target.

In addition, in the case where the server is configured to be able to display, on the management screen, that location information of the relay device associated with the observation target is outside the observation area set in correspondence with the observation target under the condition that the location information is outside the observation area, that the relay device reaches the outside of the management area can be visually grasped through the management screen.

Moreover, in the case where the server is configured to be able to display, on the management screen, that location information of the relay device associated with the observation target is inside the observation area (entering into the observation area from outside the observation area) set in correspondence with the observation target, that the relay device has returned into the management area can be visually grasped through the management screen.

In addition, in the case where the server is configured to be able to display, on the management screen, that location information of the apparatus associated with the observation target is outside the observation area set in correspondence with the observation target under the condition that the location information is outside the observation area, that the apparatus reaches the outside of the observation area can be visually grasped through the management screen.

Moreover, in the case where the server is configured to be able to display, on the management screen, that location information of the apparatus associated with the observation target is inside the observation area (entering into the observation area from outside the observation area) set in correspondence with the observation target, that the apparatus has returned into the observation area can be visually grasped through the management screen.

Here, "apparatus (predetermined apparatus)" may be in any form as long as it can be mounted to an observation target (human being) or an observation target (object). Examples of the "apparatus (predetermined apparatus)" include a wearable device (a computer device worn on the wrist, leg, etc.), such as a monitoring band, attached to the wrist of the observation target (human being).

Here, the "observation target" is not limited to human beings, but may also be animals such as dogs or cats or objects such as drones.

Moreover, examples of the "observation information" here include vital data (e.g., body temperature data, sleep data, pulse data, blood pressure data, blood oxygen data, electrocardiogram data, etc.) obtained from the observation target (human being) or data (e.g., information on the remaining battery capacity, whether various parts are working properly, etc.) obtained from the observation target (object).

Effects of Invention

In the observation system and the observation program according to the invention, suitable monitoring can be realized more sufficiently.

BRIEF DESCRIPTION OF DRAWINGS

FIG. 3K is a view illustrating a method for using the monitoring band observation system X.

DESCRIPTION OF EMBODIMENTS

In the following, the aspects for embodying the invention (referred to as "embodiments" in the following) are described. The description is made according to the following order.

1. First Embodiment
2. Second Embodiment
3. Modified example

In addition, in the embodiments, the case where the person as an observation target (monitored target) (referred to as "monitored target") wears a monitoring band (an example of a predetermined apparatus) is described as an example. In addition, the person monitoring the monitored target is referred to as a "monitoring person".

1. FIRST EMBODIMENT

[Description of System Configuration]

Figure 1:
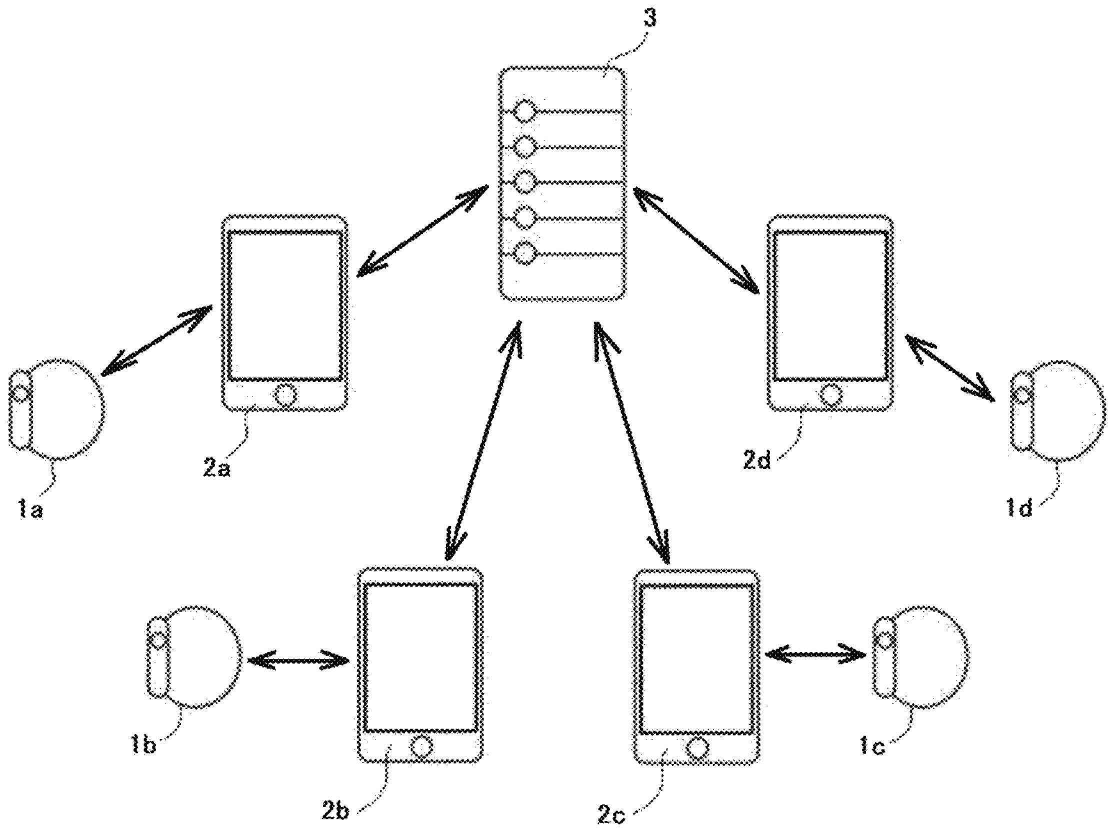
FIG. 1 is a schematic view illustrating a monitoring band observation system X.

FIG. 1 is a schematic view illustrating a monitoring band observation system X, which is a configuration example of an observation system according to the invention. The monitoring band observation system X shown in FIG. 1 is formed by a monitoring band 1 (1*a*, 1*b*, 1*c*, 1*d*), a smartphone 2 (2*a*, 2*b*, 2*c*, 2*d*) as a relay device, and a server 3.

In the embodiment, by installing an "observation program" of the invention to the smartphone (an example of the portable relay device), the smartphone may function as a relay device (in the embodiment, the case where "smartphone" is recited refers to a smartphone having a function of a relay device).

In addition, in the embodiment, the monitoring band wore by the monitored target is associated with the smartphone of the monitored target him/herself.

Specifically, the "monitoring band 1*a*" wore by a monitored target A (not shown) is associated with the "smartphone 2*a*" possessed by the monitored target A, the "monitoring band 1*b*" wore by a monitored target B (not shown) is associated with the "smartphone 2*b*" possessed by the monitored target B, the "monitoring band 1*c*" wore by a monitored target C (not shown) is associated with the "smartphone 2*c*" possessed by the monitored target C, and the "monitoring band 1*d*" wore by a monitored target D (not shown) is associated with the "smartphone 2*d*" possessed by the monitored target D.

In addition, the monitoring band exchanges information with the server 3 via the associated smartphone.

Specifically, the "monitoring band 1*a*" exchanges information with the server 3 via the "smartphone 2*a*", the "monitoring band 1*b*" exchanges information with the server 3 via the "smartphone 2*b*", the "monitoring band 1*c*" exchanges information with the server 3 via the "smartphone 2*c*", and the "monitoring band 1*d*" exchanges information with the server 3 via the "smartphone 2*d*".

In the embodiment, the case where the monitoring band and the smartphone are in one-to-one correspondence is described. However, one smartphone may also correspond to two or more monitoring bands.

In the following, "monitoring band 1*a*", "monitoring band 1*b*", "monitoring band 1*c*", and "monitoring band 1*d*" are generally referred to as "monitoring band 1". Similarly, "smartphone 2*a*", "smartphone 2*b*", "smartphone 2*c*", and "smartphone 2*d*" are generally referred to as "smartphone 2".

Here, the monitoring band 1 is configured to be connectible with the smartphone 2 via a wireless network. In addition, the smartphone 2 is configured to be accessible to the server 3 via an Internet 4 (wireless).

Regarding "wireless network", it suffices as long as the monitoring band 1 and the smartphone 2 can be wirelessly connected. Examples of the wireless network may include Bluetooth (registered trademark), LoRaWAN (registered trademark), etc., and the wireless network is not particularly limited.

Figure 2:
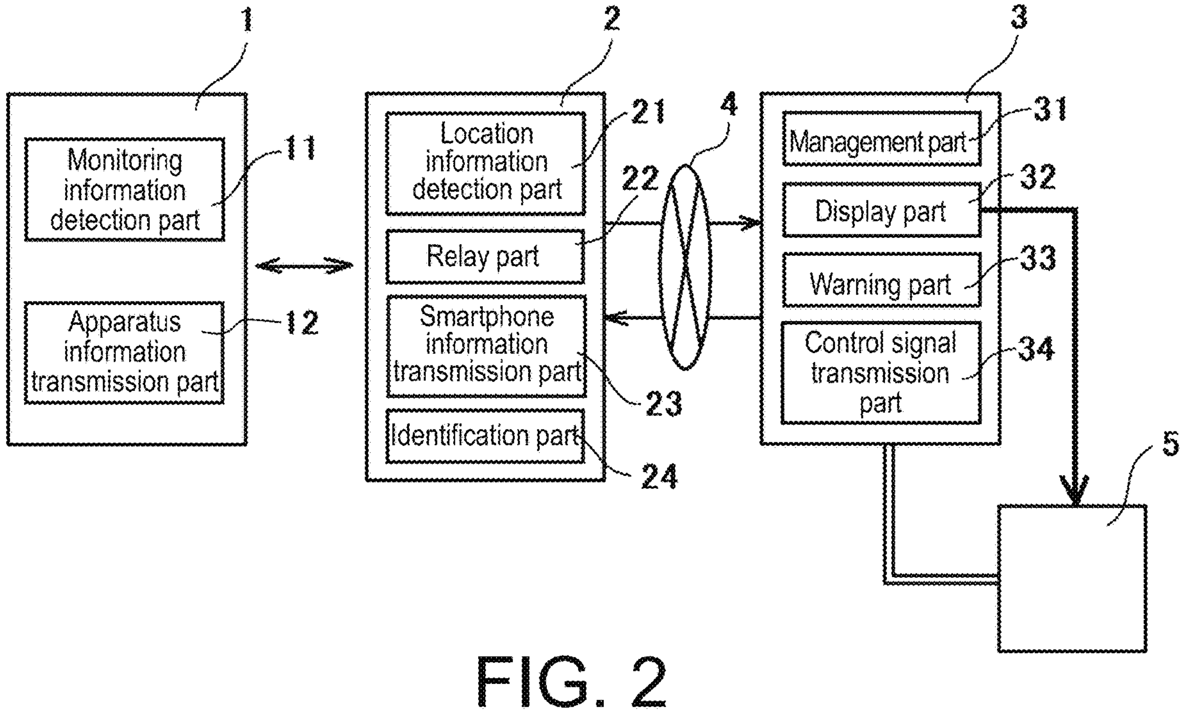
FIG. 2 is a schematic view illustrating the monitoring band observation system X.

In addition, the monitoring band 1 has a "monitoring information detection part 11" and an "apparatus information transmission part 12" (see FIG. 2).

Here, the monitoring information detection part 11 is configured to be able to access vital data of the monitored target to which the monitoring band 1 is mounted.

"Vital data" refer to data indicating vital signs of the monitored target, such as body temperature data, sleep data, pulse data, blood pressure data, blood oxygen data, electrocardiogram data, etc.

In addition, examples of the values obtained as vital data include a lowest value, a highest value, a most frequent value, an average value, a deviation value, a binary value, etc., within a predetermined period.

In addition, the apparatus information transmission part 12 is configured to be able to transmit the "vital data" and "remaining battery capacity data of the monitoring band 1" obtained by the monitoring information detection part 11 to the smartphone 2.

Then, the smartphone 2 has a "location information detection part 21", a "relay part 22", a "smartphone information transmission part 23", and an "identification part 24" (see FIG. 2).

Here, the location information detection part 21 is configured to be able to obtain the location coordinates of the smartphone 2.

The "location coordinates" are typically obtained by positioning using GPS satellites. However, in the case where it is not possible to position using GPS satellites, it may also be that the step number, the step length, the traveling direction of the monitored target (the person carrying the smartphone 2) are estimated by using an acceleration sensor and a geomagnetic sensor, and the location information of the monitored target is estimated and calculated accumulatively from the coordinates as the start point (the point where the radio waves of the GPS satellites no longer reach).

In addition, the relay part 22 is configured to be able to receive the transmission data from the monitoring band 1 (specifically, the data transmitted by the apparatus information transmission part 12), perform data formatting based on a predetermined data format, and transmit data to the sever 3.

The data formatting here may be performed by using a known or conventional process, and the data format is not particularly limited.

That is, the relay part 22 transmits the transmission data (i.e., "vital data" and "remaining battery capacity data of the monitoring band 1") from the monitoring band 1 to the server 3.

In addition, the relay part 22 may also transmit other data (e.g., step count data, band attachment/detachment judgment data, consumed calorie data, fall judgment data, etc.) of the monitored target to the server 3.

The "step count data". "band attachment/detachment judgment data", and "consumed calorie data" can be calculated based on the vital data. Regarding the "fall judgment data", by tracking the acceleration of the monitored target by using an acceleration sensor and measuring changes of body location and motion, whether falling or collapsing occurs can be judged.

In addition, the relay part 22 is configured to be able to receive the transmission data from the server 3 (specifically, data transmitted by a warning part 33 or a control signal part 34 to be described afterwards), perform data formatting based on a predetermined data format, and transmit data to the monitoring band 1.

Here, the data formatting may also be performed by using a known or conventional process, and the data format is not particularly limited. The data format is determined in accordance with the hardware configuration or program configuration of the monitoring band 1.

In addition, the smartphone information transmission part 23 transmits the "location data", which is the location coordinates (location coordinates of the smartphone 2) obtained by the location information detection part 21 and the "remaining battery capacity data of the smartphone 2" to the server 3.

In addition, the smartphone information transmission part 23 is configured to be able to transmit an "SOS signal" to the server 3 based on an intended input of the monitored target.

In addition, the identification part 24 identifies the model of the monitoring band 1 performing transmission of the "vital data" based on a band identifier (not shown) indicating the monitoring band 1.

In addition, the identification part 24 identifies, based on a machine learning model, which data in the monitoring band observation system X the "vital data" transmitted by the monitoring band 1 corresponds to.

Here, the training data for machine learning is a combination of model information including the band identifier of the monitoring band 1 and the "vital data".

The input data in machine learning is the "vital data", and the output data is "model information (information indicating which model the monitoring band is among the known or conventional monitoring bands 1).

In addition, the server 3 is connected with a monitor 5, and has a "management part 31", a "display part 32", a "warning part 33", and a "control signal transmission part 34" (see FIG. 2).

Here, the management part 31 associates a monitored target identifier (not shown) indicating the monitored target with a band identifier (not shown), and determines monitoring data based on the "vital data". "remaining battery capacity data of the monitoring band 1", and "remaining battery capacity data of the smartphone 2" transmitted from the smartphone 2.

In addition, the management part 31 determines a "monitoring area" corresponding to the band identifier.

The "monitoring area" may refer to a predetermined area in a municipality, and may also refer to a concentric range with predetermined location coordinates as the center. In addition, the monitoring area may also refer to predetermined areas of multiple municipalities.

In addition, the management part 31 determines a "normal vital range" corresponding to the band identifier.

The "normal vital range" is determined by the management part 31 based on an intended input of the monitored target. Such "normal vital range" is individually determined for each monitored target identifier.

In addition, the display part 32 outputs a signal (display signal) for displaying on the monitor 5 a management screen corresponding to the band identifier based on at least a portion of the monitoring data.

In addition, the warning part 33 cooperates with the monitoring band 1 to alert the monitored target to draw attention to an abnormality related to the monitored target based on at least a portion of the monitoring data.

Moreover, the warning part 33 cooperates with the display part 32 to alert, on the management screen, the monitoring person to draw attention to an abnormality related to the monitored target based on at least a portion of the monitoring data.

Here, "alert" refers to a notification based on a known or conventional output device provided in the monitoring band 1, the smartphone 2, or the server 3 (computer device). As examples, such notification may be expressed visually, auditorily, and tactilely.

In the following, the alert performed by the warning part 33 is described.

(1. Alert Based on an SOS Signal)

The warning part 33 alerts the monitoring person under the condition that an SOS signal is received from the smartphone 2.

Specifically, reception of the SOS signal is displayed on the management screen to draw the attention of the monitoring person.

(2. Alert Based on Location Data)

In addition, the warning part 33 alerts the monitoring person under the condition that the location data indicates a location outside the monitoring area.

In addition, in place of or in addition to the location data indicating a location outside the monitoring area, the warning part 33 may also alert the monitoring person under the condition that the location data indicates a location within a predetermined area.

"Indicating a location outside" means: (1) at least a portion of the location coordinates is outside the monitoring area; or (2) at least a portion of the location coordinates is outside the monitoring area for a predetermined time.

(3. Alert Based on Vital Data)

In addition, the warning part 33 alerts the monitored target under the condition that the vital data is out of the normal vital range.

Specifically, in order to notify the monitored target that his/her vital data is out of the normal range, a message (an SMS or e-mail, etc.) is transmitted to the smartphone 2, and a vibe command signal is transmitted to the monitoring band 1 via the smartphone 2. The monitoring band 1 receiving the vibe command signal performs a predetermined vibration operation.

In addition, regarding the message for notifying that the vital data is out of the normal range, the message is not only transmitted to the monitored target, but also transmitted to a registered registrant (e.g., a family member of the monitored target, etc.) for each monitored target (each monitoring identifier).

In addition, the warning part 33 alerts the monitoring person under the condition that the vital data is out of the normal vital range.

Specifically, that the vital data of the monitored target is out of the normal range is displayed on the management screen to draw the attention of the monitoring person.

After the warning part 33 alerts the monitoring person, in the case where the vital data of the monitored target is no longer out of the normal range, the display part 32 outputs a signal (display signal) to be displayed on the monitor 5, so that it is known on the management screen that "vital data was out of the normal range".

(4. Alert Based on Remaining Battery Capacity Data)

In addition, the warning part 33 alerts the monitored target under the condition that the remaining battery capacity of the monitoring band 1 is equal to or less than a predetermined reference value.

Specifically, in order to notify the monitored target that the remaining battery capacity of the monitoring band 1 is equal to or less than the reference value, a message (an SMS or e-mail, etc.) is transmitted to the smartphone 2, and a vibe command signal is transmitted to the monitoring band 1 via the smartphone 2. The monitoring band 1 receiving the vibe command signal performs a predetermined vibration operation.

Similarly, the warning part 33 alerts the monitored target under the condition that the remaining battery capacity of the smartphone 2 is equal to or less than the predetermined reference value.

Specifically, in order to notify the monitored target that the remaining battery capacity of the smartphone 2 is equal to or less than the reference value, a message (an SMS or e-mail, etc.) is transmitted to the smartphone 2, and a vibe command signal is transmitted to the monitoring band 1 via the smartphone 2. The monitoring band 1 receiving the vibe command signal performs a predetermined vibration operation.

In addition, the warning part 33 alerts the monitoring person under the condition that the remaining battery capacity of the monitoring band 1 is equal to or less than the predetermined reference value.

Specifically, that the remaining battery capacity of the monitoring band 1 is equal to or less than the reference value is displayed on the management screen to draw the attention of the monitoring person.

Similarly, the warning part 33 alerts the monitoring person under the condition that the remaining battery capacity of the smartphone 2 is equal to or less than the predetermined reference value.

Specifically, that the remaining battery capacity of the smartphone 2 is equal to or less than the reference value is displayed on the management screen to draw the attention of the monitoring person.

In addition, the warning part 33 alerts the monitored target under the condition that the remaining battery capacity of the monitoring band 1 becomes substantially zero, that is, under the condition that it is impossible to exchange information with the monitoring band 1.

Specifically, in order to notify the monitored target that the remaining battery capacity of the monitoring band 1 becomes substantially zero and it is impossible to connect the monitoring band 1, a message (an SMS or e-mail, etc.) is transmitted to the smartphone 2.

Similarly, the warning part 33 alerts the monitoring person under the condition that the remaining battery capacity of the monitoring band 1 becomes substantially zero, that is, under the condition that it is impossible to exchange information with the monitoring band 1.

Specifically, that the remaining battery capacity of the monitoring band 1 is substantially zero and it is impossible to connect the monitoring band 1 is displayed on the management screen to draw the attention of the monitoring person.

In addition, the warning part 33 alerts the monitoring person under the condition that the remaining battery capacity of the smartphone 2 becomes substantially zero, that is, under the condition that it is impossible to exchange information with the smartphone 2.

Specifically, that the remaining battery capacity of the smartphone 2 is substantially zero and it is impossible to connect the smartphone 2 is displayed on the management screen to draw the attention of the monitoring person.

In addition, based on the intended input (intended input of the monitoring person) via the management screen displayed on the monitor 5, a control signal that controls the monitoring band 1 is determined, and the control signal is transmitted to the monitoring band 1 via the smartphone 2.

[Description of Method for Using the System]

In the following, an example of a method for using the monitoring band observation system X is described.

Figure 3A:
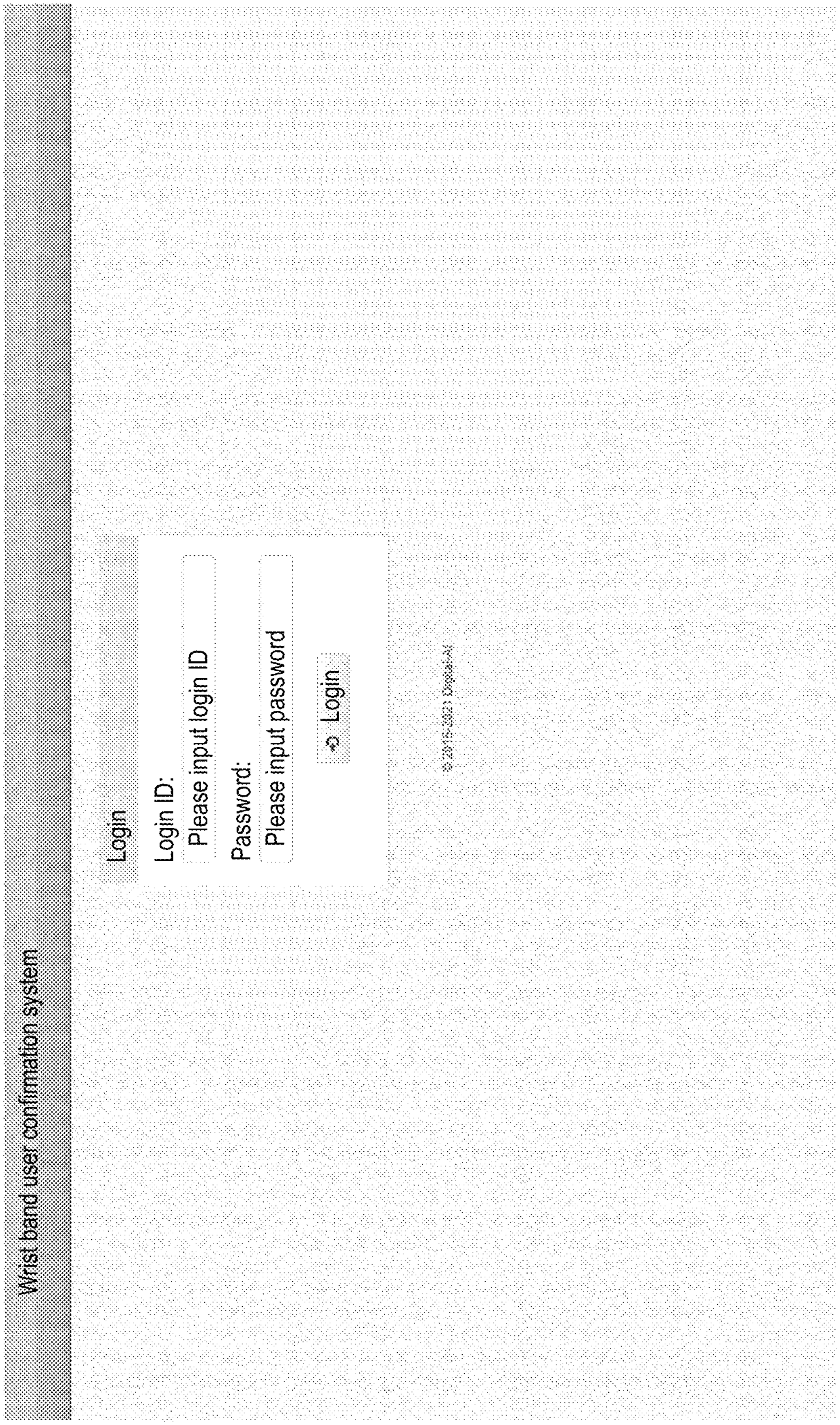
FIG. 3A is a view illustrating a method for using the monitoring band observation system X.
Figure 3B:
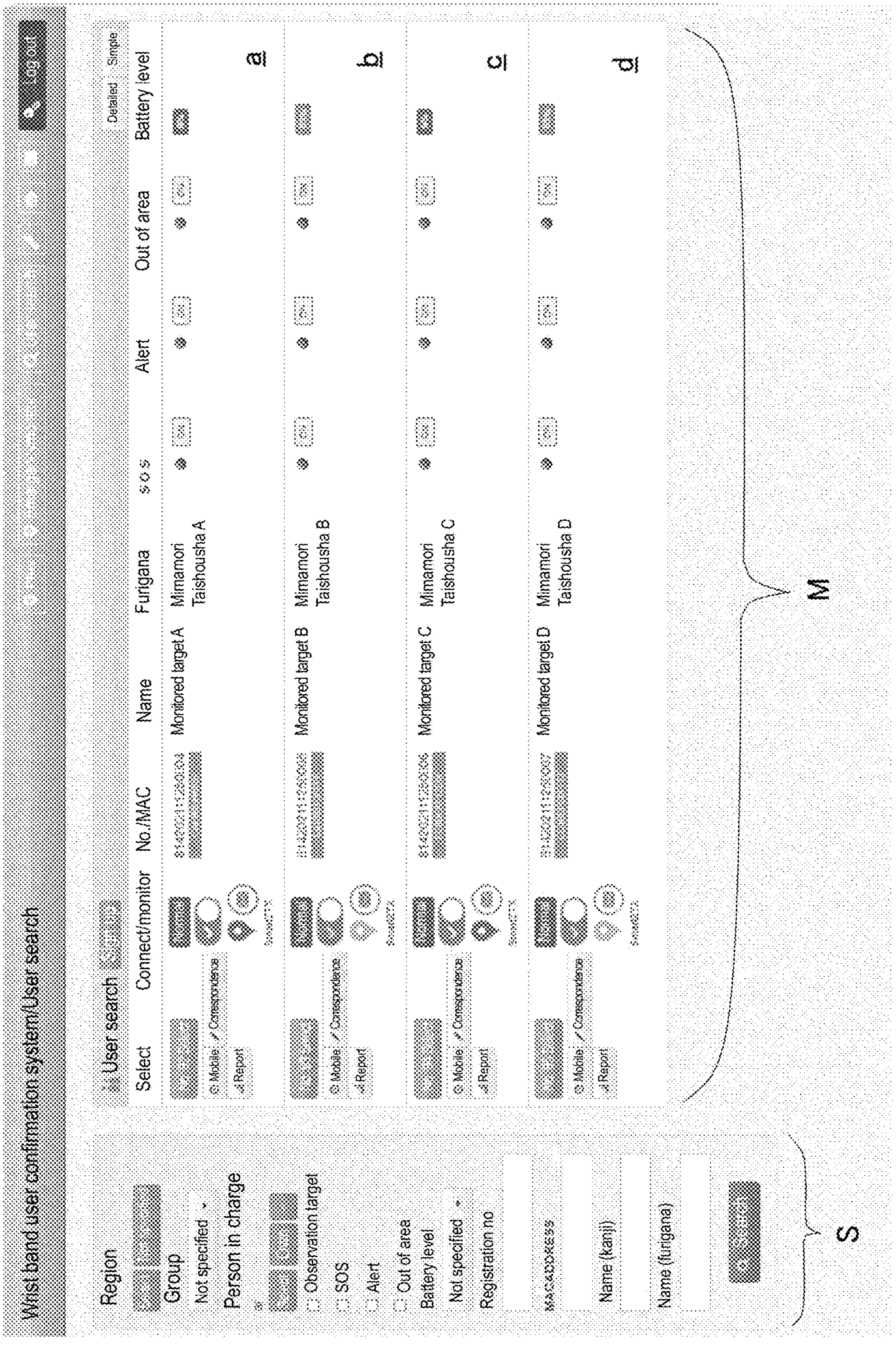
FIG. 3B is a view illustrating a method for using the monitoring band observation system X.
Figure 3C:
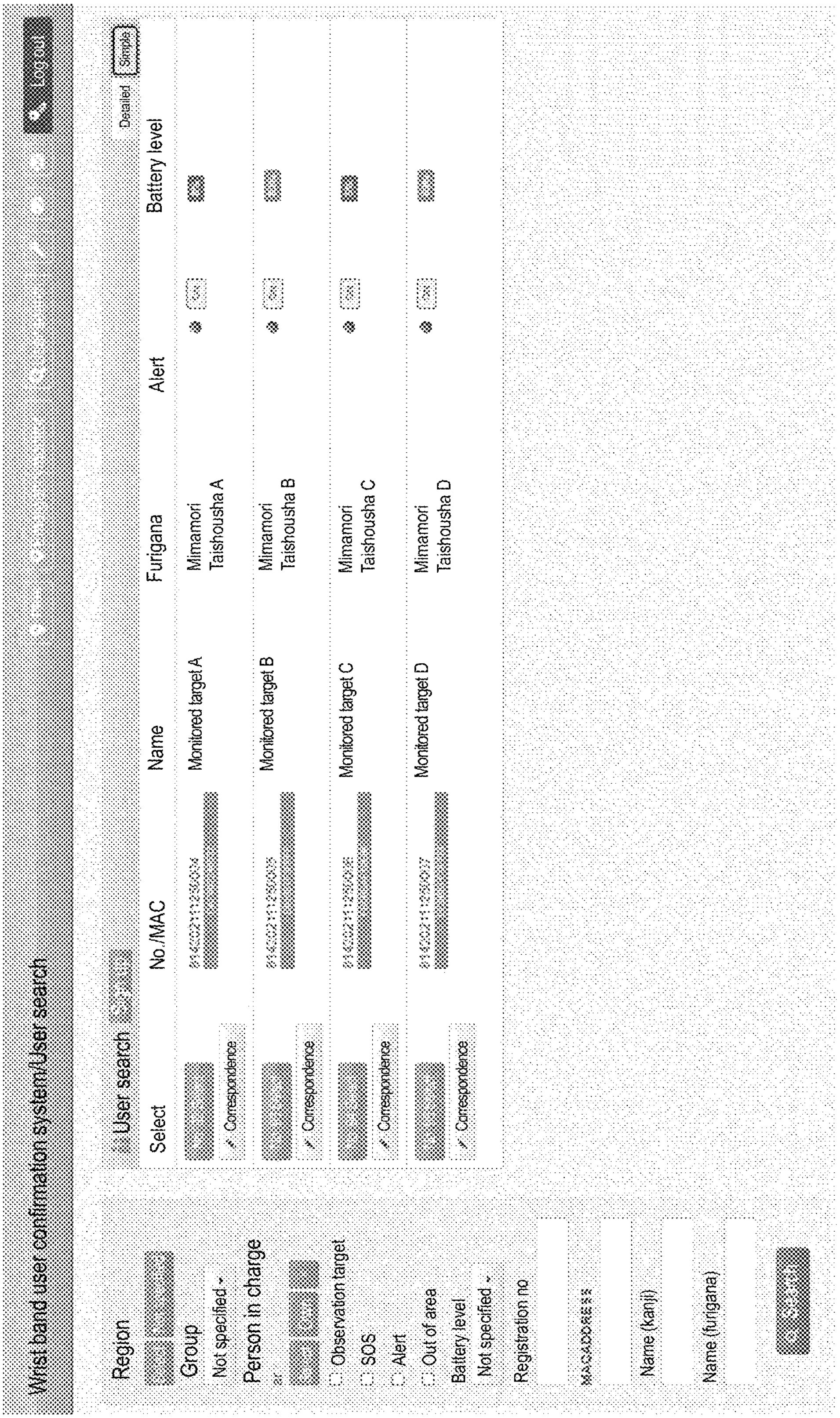
FIG. 3C is a view illustrating a method for using the monitoring band observation system X.
Figure 3D:
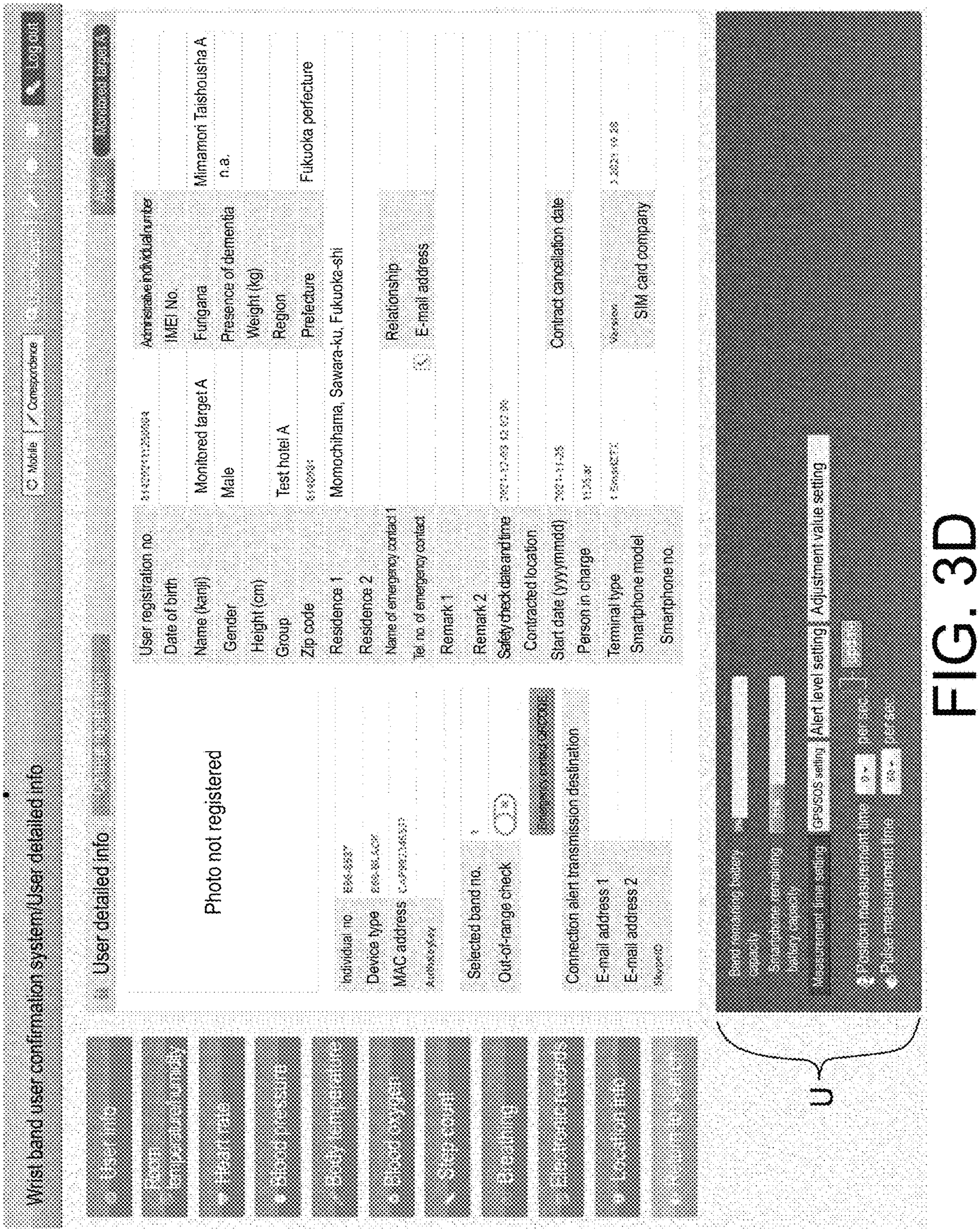
FIG. 3D is a view illustrating a method for using the monitoring band observation system X.
Figure 3E:
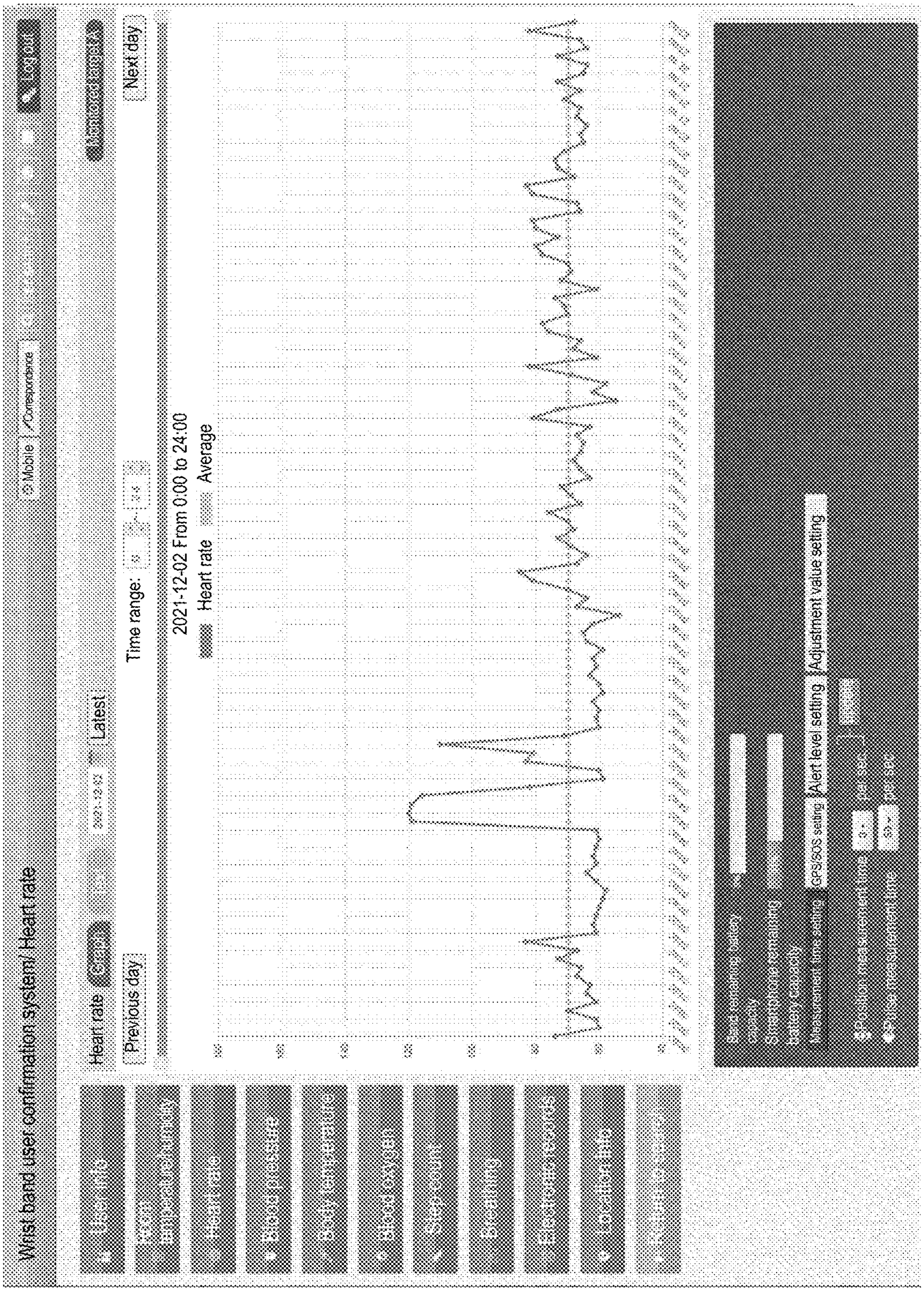
FIG. 3E is a view illustrating a method for using the monitoring band observation system X.
Figure 3F:
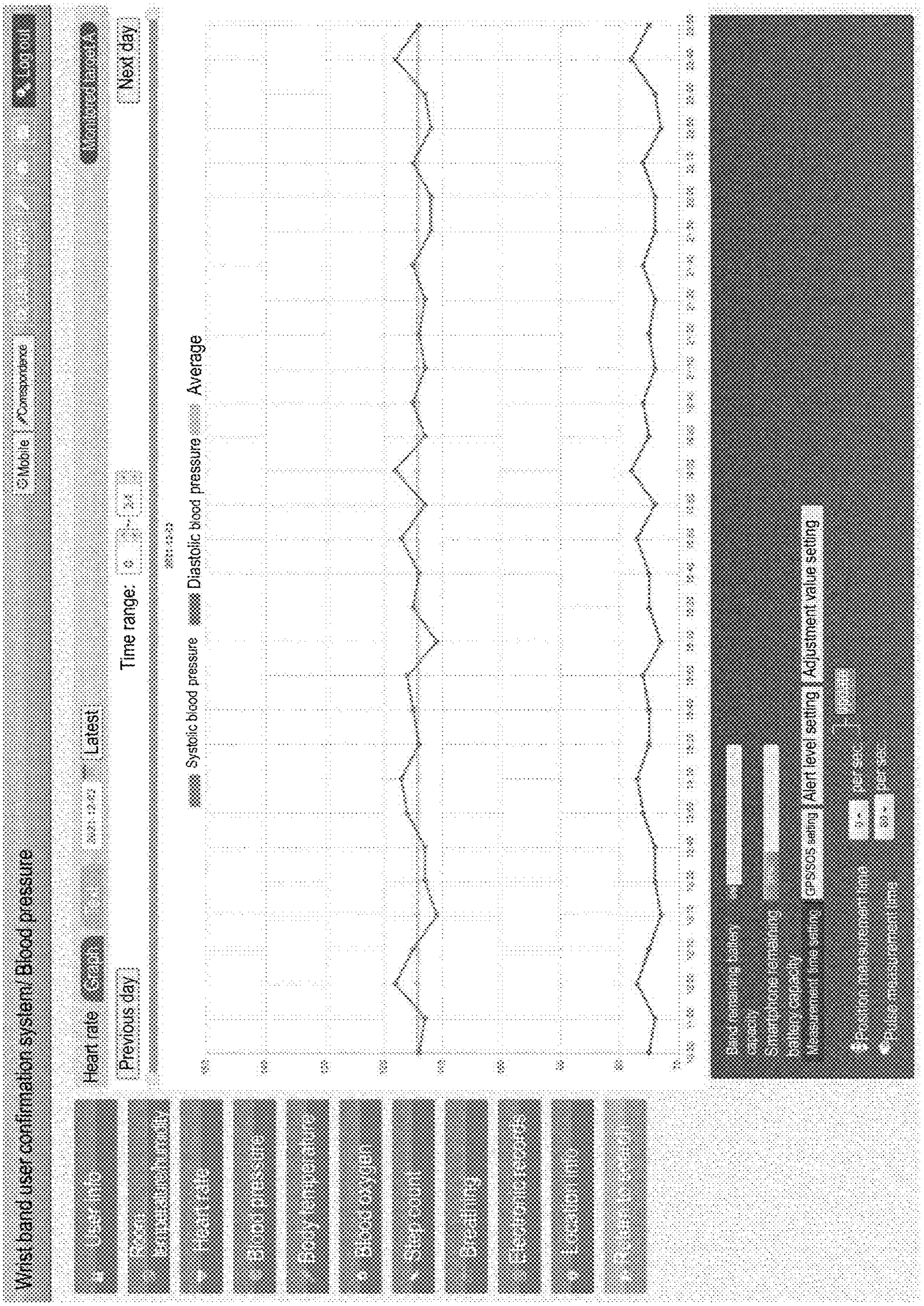
FIG. 3F is a view illustrating a method for using the monitoring band observation system X.
Figure 3G:
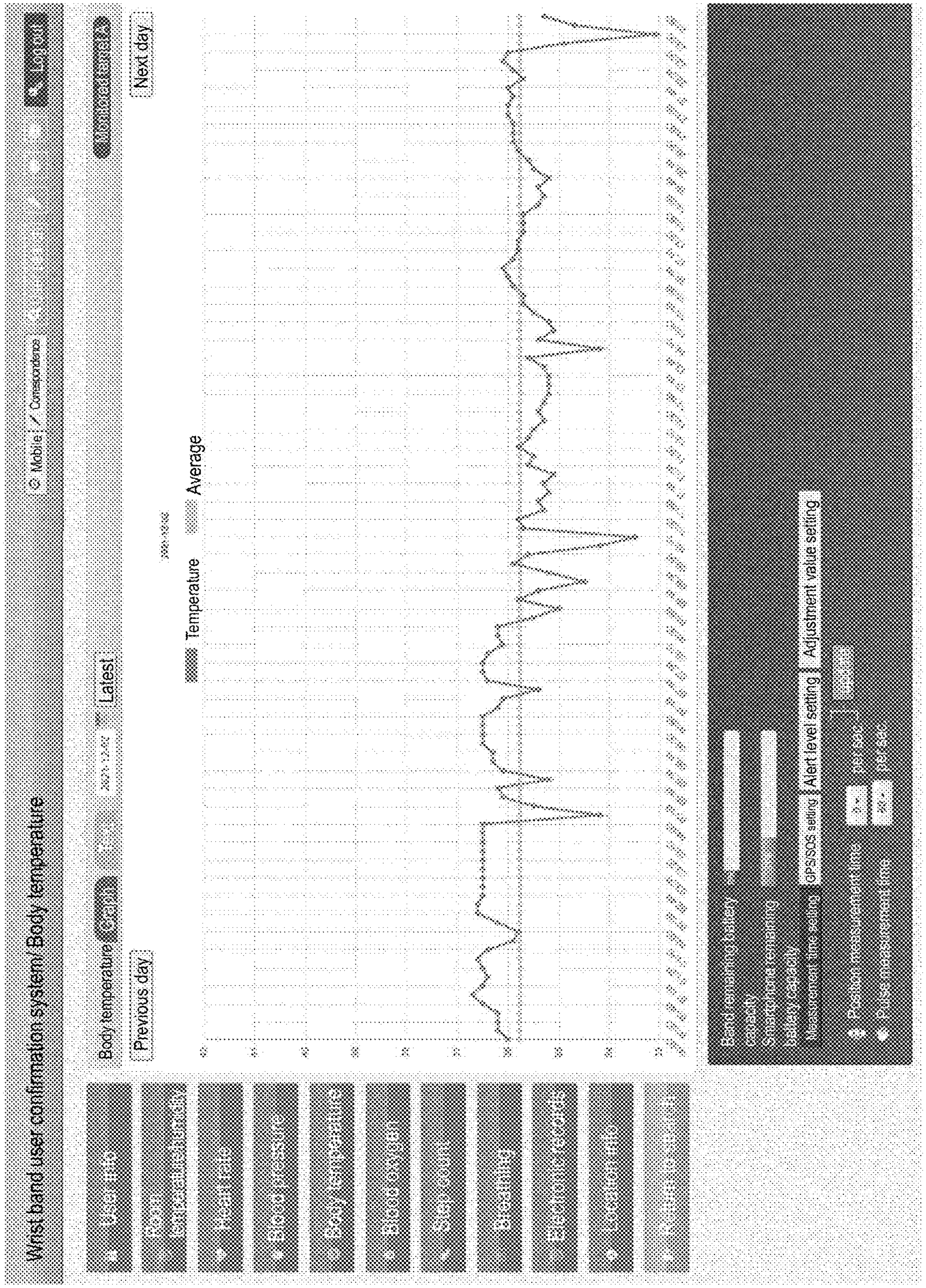
FIG. 3G is a view illustrating a method for using the monitoring band observation system X.
Figure 3H:
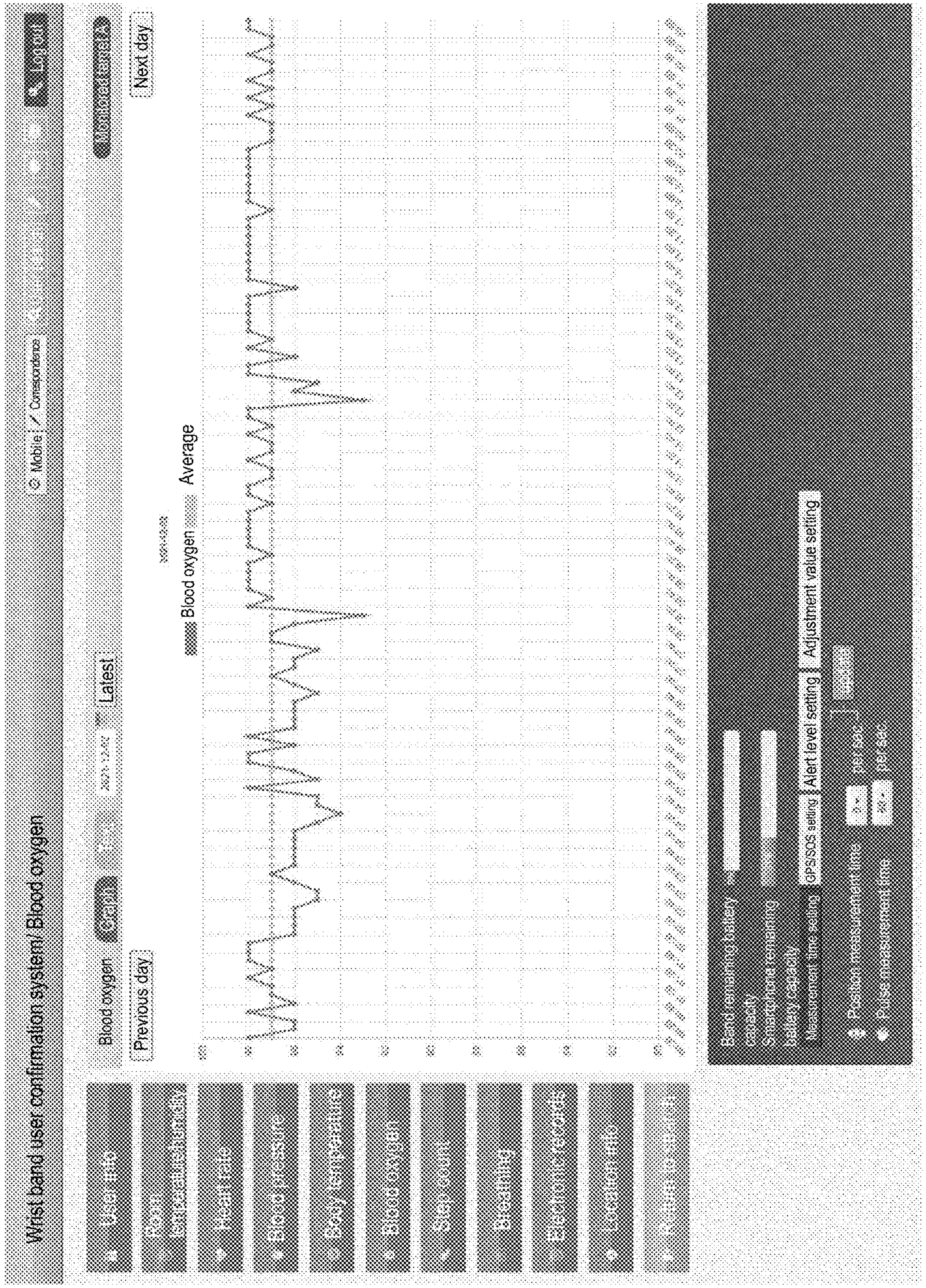
FIG. 3H is a view illustrating a method for using the monitoring band observation system X.
Figure 3I:
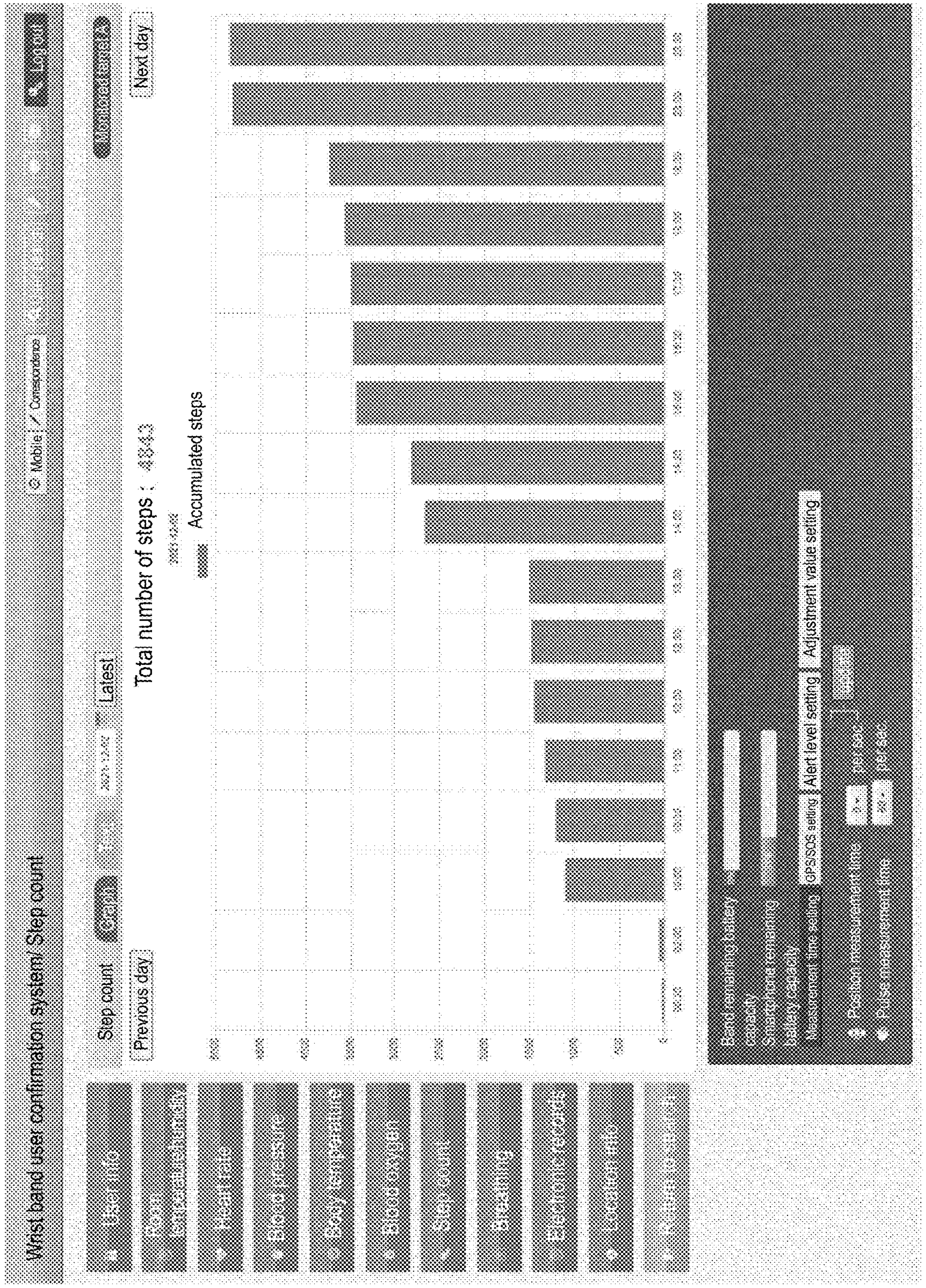
FIG. 3I is a view illustrating a method for using the monitoring band observation system X.
Figure 3J:
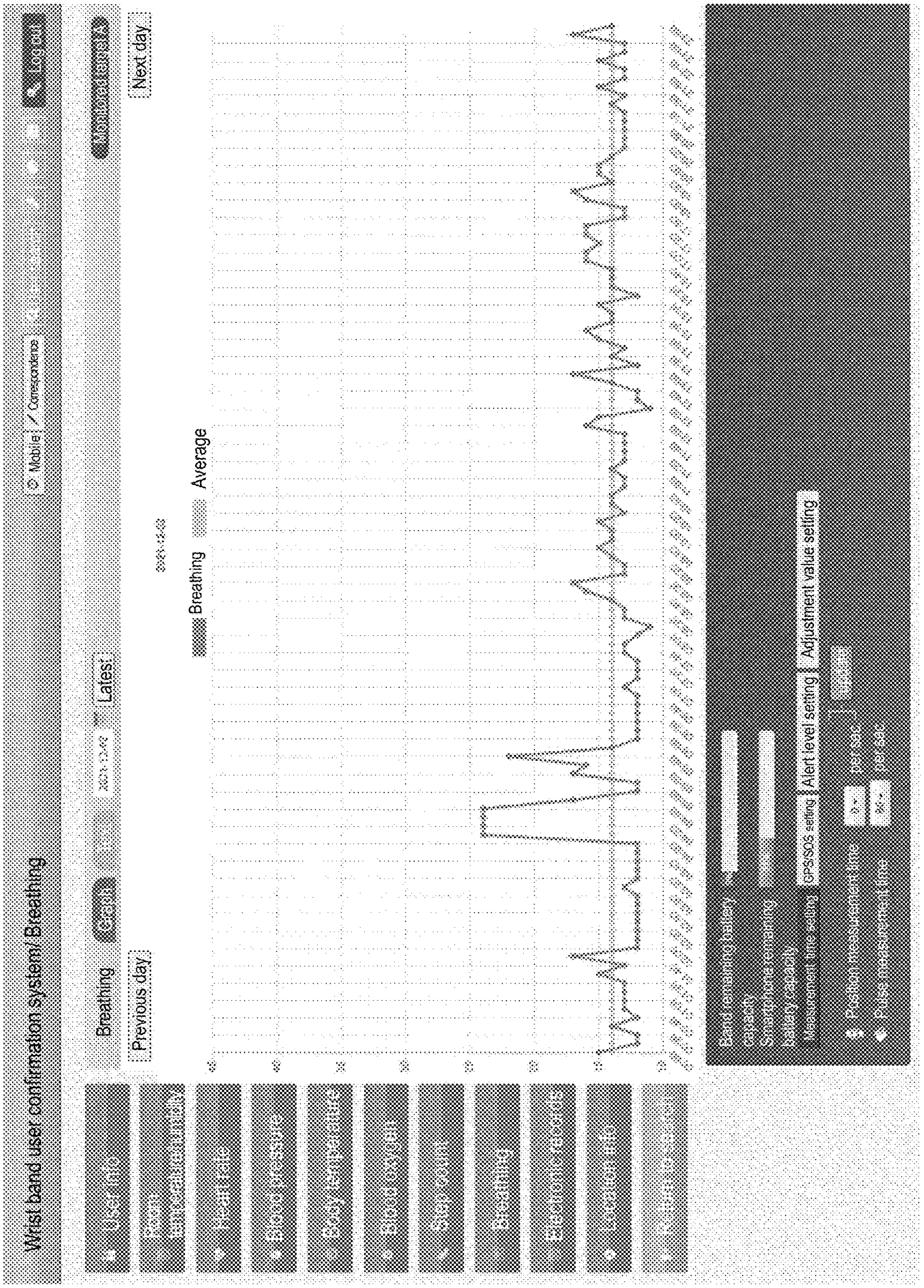
FIG. 3J is a view illustrating a method for using the monitoring band observation system X.
Figure 3L:
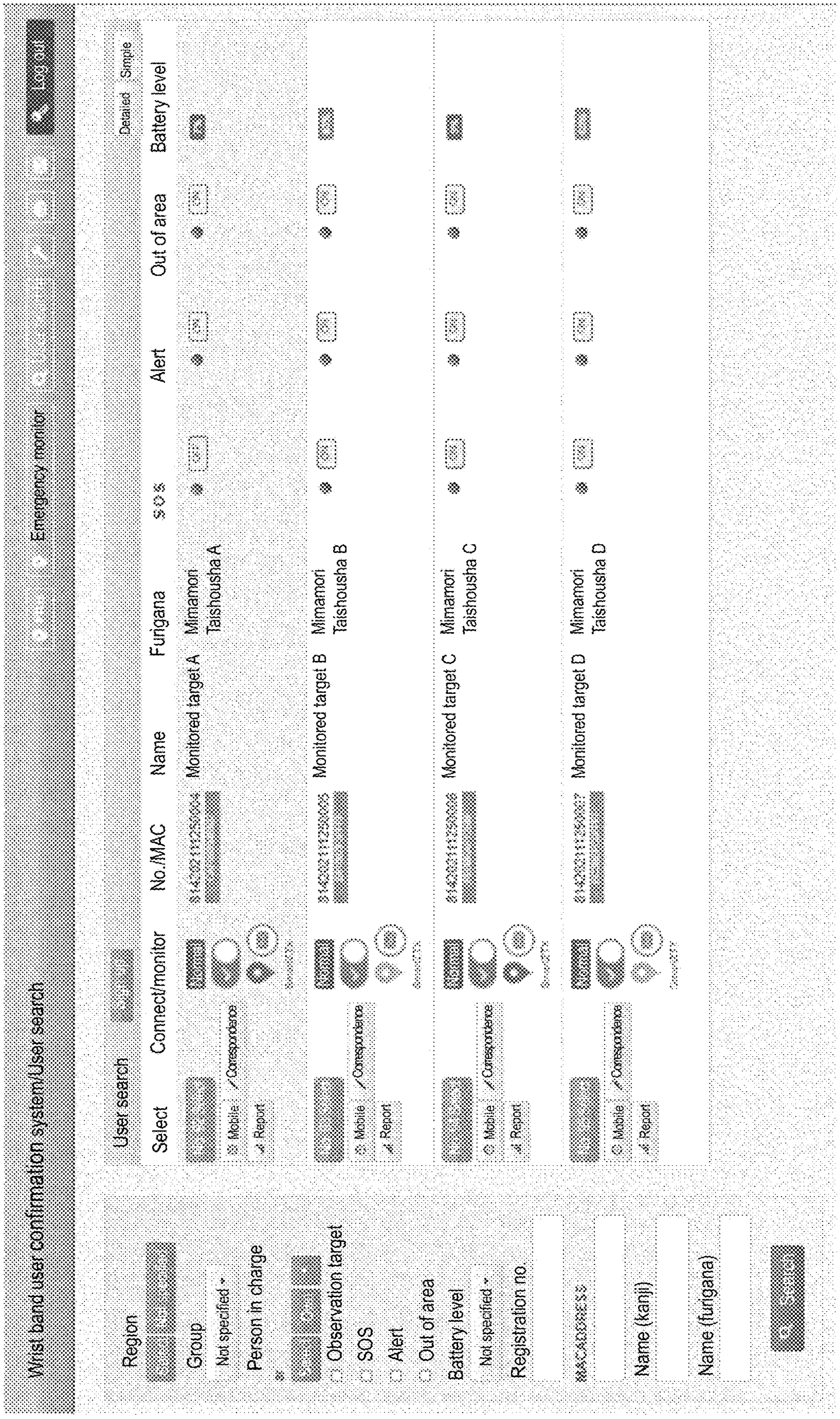
FIG. 3L is a view illustrating a method for using the monitoring band observation system X.
Figure 3M:
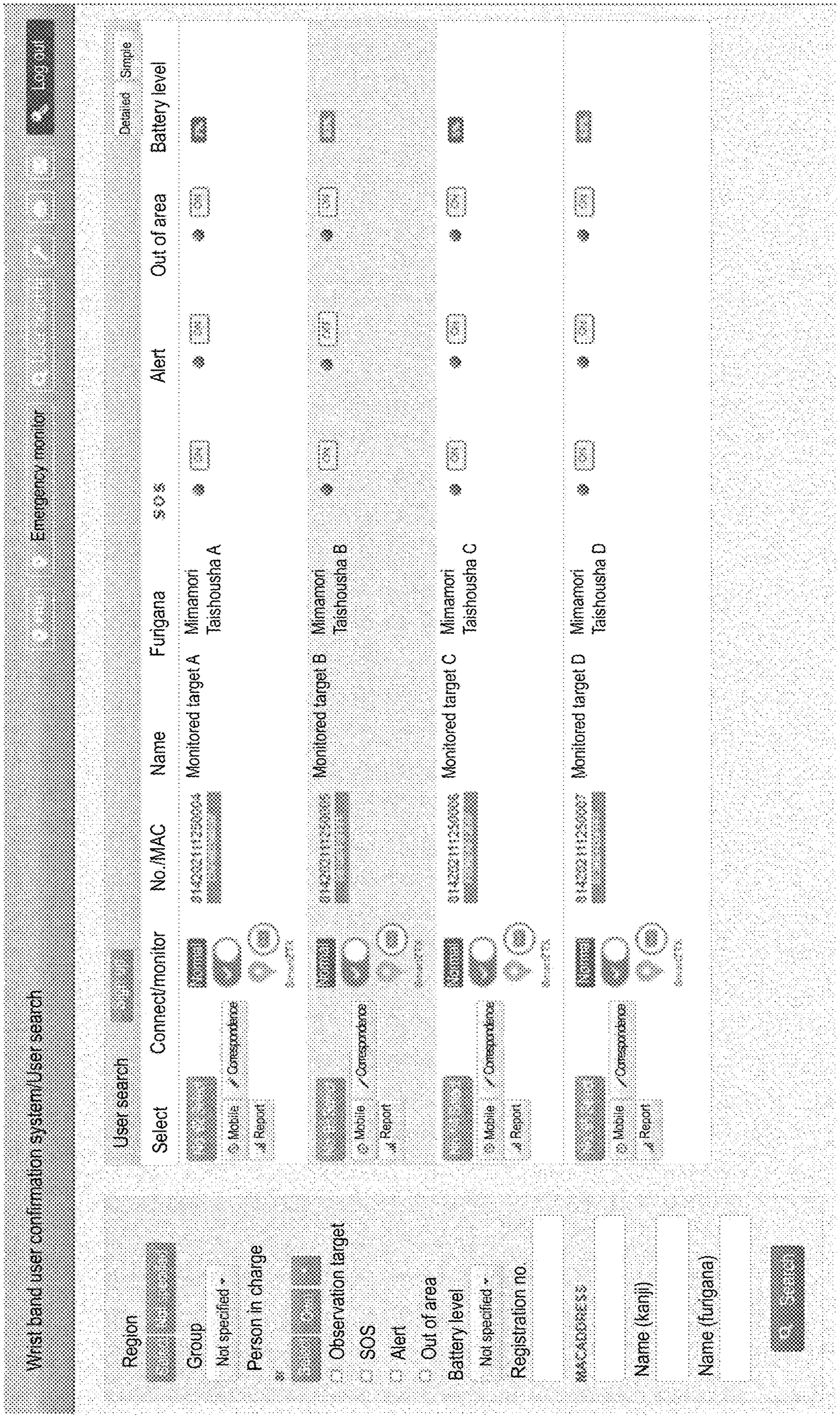
FIG. 3M is a view illustrating a method for using the monitoring band observation system X.
Figure 3N:
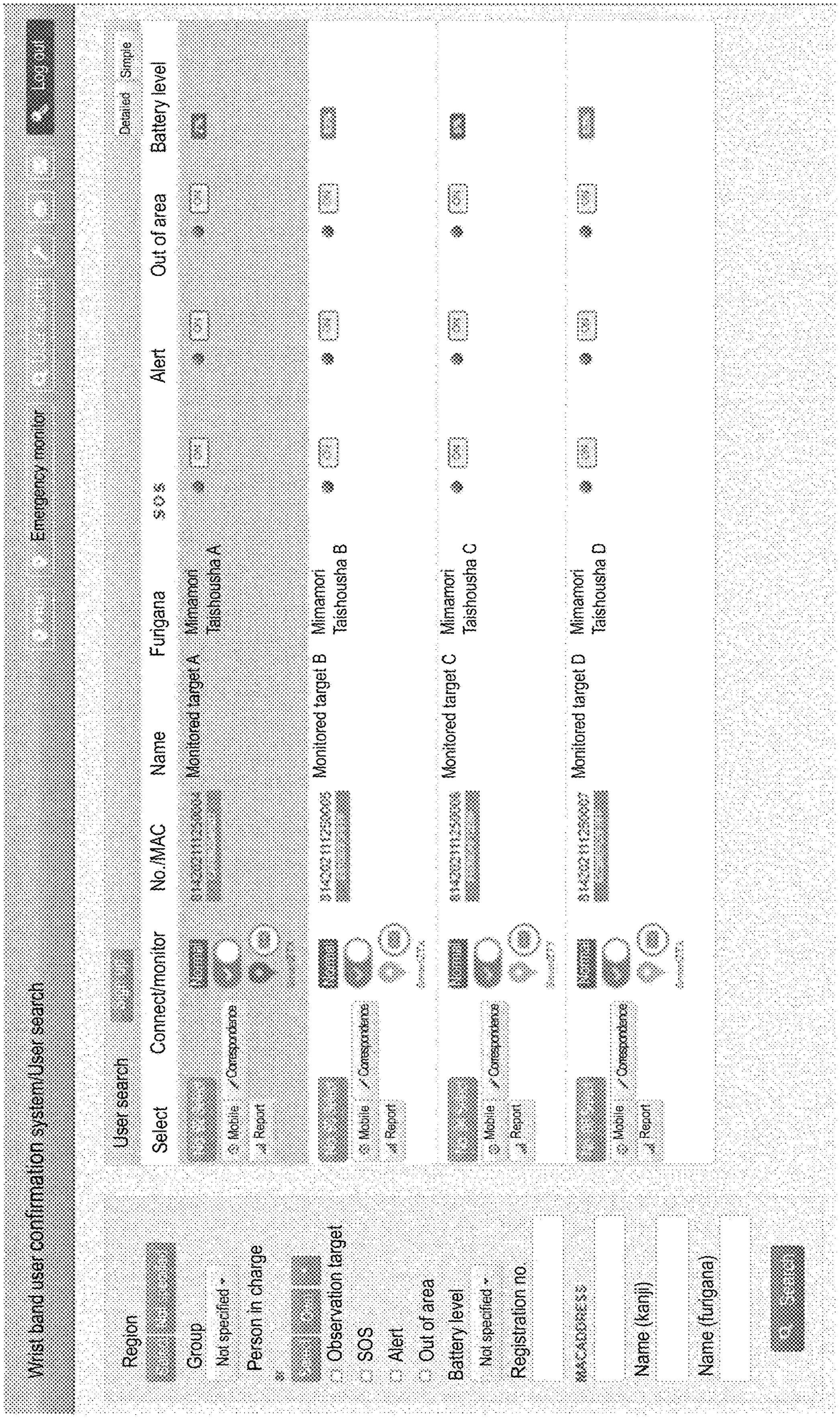
FIG. 3N is a view illustrating a method for using the monitoring band observation system X.

FIGS. 3A to 3N are views for describing the method for using the monitoring band observation system X and illustrate the display screens of the monitor 5.

Firstly, the monitoring person using the monitoring band observation system logs into the system. Specifically, log-in is performed by inputting a log-in ID and a password (see FIG. 3A).

The screen immediately after log-in is as shown in FIG. 3B. In the initial screen, "information of all users that are registered" is displayed on a region (referred to as "main screen" in the following) indicated by a symbol M, and "search tool" is displayed in a region (referred to as "sub-screen" indicated by a symbol S.

Specifically, in the main screen, the information of a "monitored target A" is displayed in a region labeled by a symbol a, the information of a "monitored target B" is displayed in a region labeled by a symbol b, the information of a "monitored target C" is displayed in a region labeled by a symbol c, and the information of a "monitored target D" is displayed in a region labeled by a symbol d.

In addition, by using the "search tool" in the sub-screen, the users can be narrowed down by using various conditions, and the result after a narrowing search is performed is displayed on the main screen.

As a search that narrows down the users, for example, when the button "select a region" is clicked to select a region (e.g., select "Fukuoka-shi"), the user information corresponding to the selected region is displayed on the main screen.

Similarly, when the button "designate a group" is clicked to select a group (e.g., select "geriatric facility A"), the user information corresponding to the selected group is displayed on the main screen.

Similarly, when the button "select a person in charge" is clicked to select a person in charge (e.g., select "Mimamori Taro"), the user information corresponding to the selected person in charge is displayed on the main screen.

Similarly, when the button "designate a battery level" is clicked to select a remaining battery capacity (e.g., select "0 to 25%"), the user information corresponding to the selected battery level is displayed on the main screen.

As another search for narrowing down the users, for example, when "monitored target", "SOS", "alert", and/or "out of area" is checked, the user information corresponding to the checked item is displayed on the main screen.

As yet another search for narrowing down the users, for example, when "registered number" "MACADDRESS", "Name (kanji)", and/or "Name (furigana)" is input, the user information corresponding to the input item is displayed on the main screen.

Also, in the initial screen, the "main screen" is displayed in detail (see FIG. 3B). However, by clicking the "Simple" button at the upper right of the screen, the "main screen" is displayed in a simple display mode (see FIG. 3C).

In the state in which the "main screen" is displayed in the simple display mode, by clicking the "Detailed" button at the upper right of the screen, the "main screen" is displayed in a detailed display mode.

Then, among the user information displayed on the "main screen", by clicking the buttons "No. 92 Select" to "No. 95 Select", the detailed information of the information of the corresponding users is displayed.

For example, in the information of the monitored target A, when the button "No. 92 Select" is clicked, "user information (detailed information of the monitored target A)" is displayed on the "main screen", and "menu information" is displayed on the "sub-screen" (see FIG. 3D).

Here, as the "user information", "photo information", "individual number of the monitoring band 1", "device type of the monitoring band 1", "MAC address of the monitoring band 1", "AuthKey of the monitoring band 1", "connection alert transmission destination (e-mail address, Skype ID)", "user registration number", "administrative individual number", "user date of birth". "IMEI number". "user name (kanji)", "user name (furigana)", "user gender", "presence of dementia", "height (cm)", "weight (kg)", "group", "region", "postal code", "prefecture". "address", "emergency contact name", "relationship". "emergency contact phone number". "emergency contact email address", "safety check date and time", and "contracted location", "contract start date (yyyymmdd)", "contract cancellation date (yyyymmdd)". "person in charge". "terminal type", "terminal version", "smartphone model", "SIM card company", "smartphone phone number", etc., are displayed.

In addition, in a region indicated by a symbol U (referred to as "lower screen" in the following), the "remaining battery capacity of the monitoring band 1" and "remaining battery capacity of the smartphone 2" are displayed.

Moreover, in the "lower screen", various buttons, such as "measurement time setting". "GPS•SOS setting". "alert level setting", "adjustment value setting", are displayed.

Here, when the button "measurement time setting" is clicked, (1) at every how many seconds a location measurement time is performed by the monitoring band 1; and (2) at every how many seconds a pulse measurement time is performed by the monitoring band 1 can be set.

In addition, when the button "GPS. SOS setting" is clicked, (1) ON/OFF of a GPS function of the smartphone 2; and (2) ON/OFF of an SOS function of the user can be set.

In addition, when the button "alert level setting" is clicked, a normal vital range can be set. Specifically, (1) upper and lower limits of heart rate: (2) upper and lower limits of systolic blood pressure: (3) upper and lower limits of diastolic blood pressure; (4) upper and lower limits of body temperature; and (5) upper and lower limits of blood oxygen can be set.

In addition, when the button "adjustment value setting" is clicked, adjustment values of heart rate, systolic blood pressure, diastolic blood pressure, body temperature, and blood oxygen (differences between actual values measured using a medical apparatus and actual values measured using the monitoring band) can be set.

Then, among the "menu information" displayed on the "sub screen", when the button "heart rate" is clicked, the data of heart rate is displayed on the "main screen" (see FIG. 3E).

Similarly, among the "menu information" displayed on the "sub screen", when the button "blood pressure" is clicked, the data of blood pressure is displayed on the "main screen" (see FIG. 3F).

Similarly, among the "menu information" displayed on the "sub screen", when the button "body temperature" is clicked, the data of body temperature is displayed on the "main screen" (see FIG. 3G).

Similarly, among the "menu information" displayed on the "sub screen", when the button "blood oxygen" is clicked, the data of blood oxygen is displayed on the "main screen" (see FIG. 3H).

Similarly, among the "menu information" displayed on the "sub screen", when the button "step count" is clicked, the data of step count is displayed on the "main screen" (see FIG. 3I).

Similarly, among the "menu information" displayed on the "sub screen", when the button "breathing" is clicked, the data of breathing is displayed on the "main screen" (see FIG. 3J).

Similarly, among the "menu information" displayed on the "sub screen", when the button "electronic records" is clicked, the data of electronic records is displayed on the "main screen" (see FIG. 3K).

Among the "menu information" displayed on the "sub screen", when the button "return to search" is clicked, the initial screen is displayed (see FIG. 3B).

Here, at the time of alerting the monitoring person, the warning part 33 displays the information of the corresponding user in color.

For example, in the case where the "SOS" signal is received from the smartphone 2 of the monitored target A, the information of the monitored target A is displayed in color (see FIG. 3L), and in the case where the vital data of the monitored target B is out of the normal vital range, the information of the monitored target B is displayed in color (see FIG. 3M).

Moreover, for example, when the remaining battery capacity of the monitoring band 1 or the smartphone 2 of the monitored target A drops to be equal to or lower than the predetermined reference value, the information of the monitored target A is displayed in color (see FIG. 3N).

In the embodiment, the display for each alert is made different considering the ease of determining the type of the alert.

[Effect]

In the monitoring band observation system X applying the invention, since the vital data is transmitted to the server 3 via the smartphone 2 carried by the monitored target, the monitoring range (the range in which the warning part 33 can alert based on the location data or the vital data) is expanded.

In addition, in the case where the remaining battery capacity of the monitoring band 1 is low or the case where the remaining battery capacity of the smartphone 2 is low, the warning part 33 of the server 3 alerts the monitored target. Therefore, the monitored target can be notified of the situation in which the monitoring band 1 and the smartphone 2 will not be connectible with each other (not connectible with each other as the battery has run out), and it can be expected to avoid the situation of being unable to monitor. That is, with the alert to the monitored target, it is possible for the monitored target to charge (charge the monitoring band 1 or the smartphone 2). With such charging, the monitoring band 1 and the smartphone 2 are prevented from being not connectible with each other (not connectible with each other as the battery has run out), thereby realizing continuous and stable monitoring.

Moreover, in the case where the remaining battery capacity of the monitoring band 1 is low or the case where the remaining battery capacity of the smartphone 2 is low, the warning part 33 of the server 3 alerts the monitoring person. Therefore, it can be expected that the situation in which the monitoring band 1 and the smartphone 2 will not be connectible with each other (not connectible with each other as the battery has run out) is resolved soon.

That is, with the alert to the monitoring person, it is possible for the monitoring person to draw the attention of the monitored target (e.g., through telephonic and/or e-mail communication), and by drawing the attention, the monitoring band 1 and the smartphone 2 are prevented from being not connectible with each other (not connectible with each other as the battery has run out), thereby continuing to realize stable monitoring.

In addition, in the case where the remaining battery capacity of the monitoring band 1 is substantially zero, the warning part 33 of the server 3 alerts the monitored target. Therefore, the monitored target can be notified of the situation in which the monitoring band 1 and the smartphone 2 are not connectible with each other (not connectible with each other as the battery of the monitoring band 1 has run out), and it can be expected that the "situation of being unable to monitor" is resolved soon.

That is, with the alert to the monitored target, it is possible for the monitored target to charge (charge the monitoring band 1). With such charging, the "situation of being unable to monitor" is resolved soon.

Moreover, in the case where the remaining battery capacity of the monitoring band 1 is substantially zero or the case where the remaining battery capacity of the smartphone 2 is substantially zero, the warning part 33 of the server 3 alerts the monitoring person. Therefore, it can be expected that the situation in which the monitoring band 1 and the smartphone 2 are not connectible with each other (not connectible with each other as the battery has run out) is resolved soon. That is, with the alert to the monitoring person, it is possible for the monitoring person to draw the attention of the monitored target (e.g., through telephonic communication, e-mail communication, and/or communication via a friend, an acquaintance, or a family member), and by drawing the attention and the monitored target performing charging (charging the monitoring band 1 or the smartphone 2), the "situation of being unable to monitor" is resolved soon.

In addition, since the monitoring band 1 is not provided with a "location information detection part" (e.g., not provided with a GPS function), the size and the weight of the monitoring band are reduced, and the power consumption of the monitoring band 1 is reduced. With the low power consumption of the monitoring band 1, the battery of the monitoring band 1 is long, and a long monitoring time is possible through a single charge.

2. SECOND EMBODIMENT

[Description of System Configuration]

Figure 4:
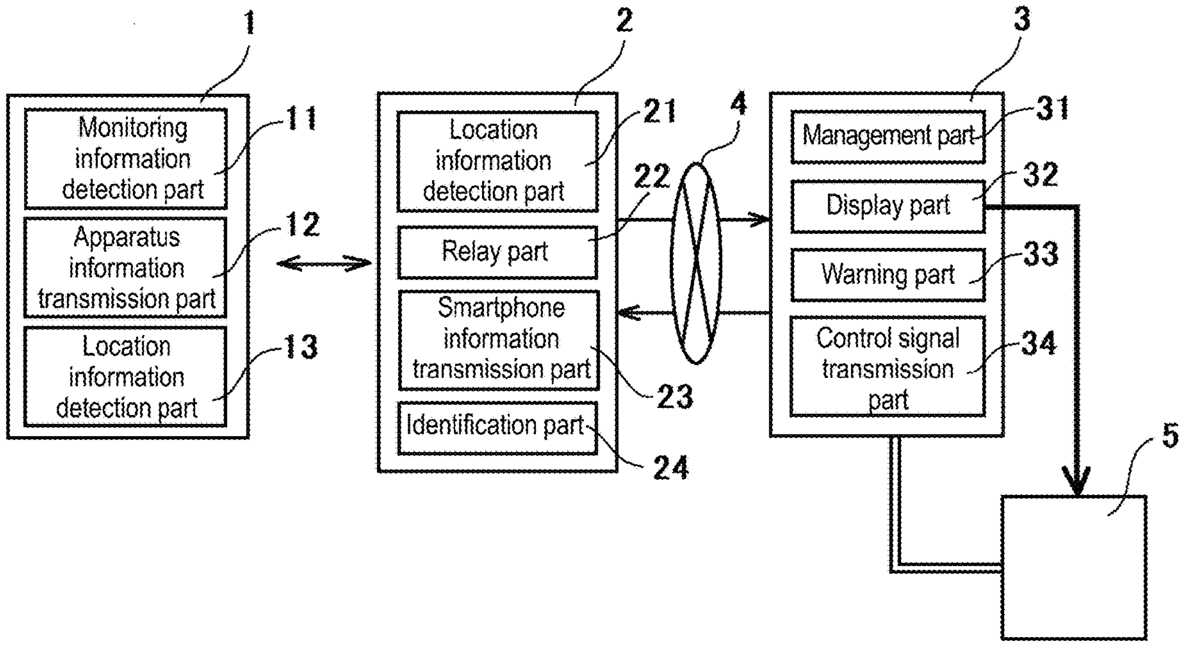
FIG. 4 is a schematic view illustrating a monitoring band observation system Y.

FIG. 4 is a schematic view illustrating a monitoring band observation system Y, which is another configuration example of the observation system according to the invention. Like the monitoring band observation system X, the monitoring band observation system Y is formed by the monitoring band 1, the smartphone 2, and the server 3. In the second embodiment, only the differences from the first embodiment are described.

Firstly, the monitoring band 1 has a "location information detection part 13" in addition to the "monitoring information detection part 11" and the "apparatus information transmission part 12" (see FIG. 4).

In addition, the location information detection part 13 is configured to be able to obtain the location coordinates of the monitoring band 1.

Like the case of the location information detection part 21, the "location coordinates" are typically obtained by positioning using GPS satellites. However, in the case where it is not possible to position using GPS satellites, it may also be that the step number, the step length, the traveling direction of the monitored target (the person to which the monitoring band 1 is mounted) are estimated by using an acceleration sensor and a geomagnetic sensor, and the location information of the monitored target is estimated and calculated accumulatively from the coordinates as the start point (the point where the radio waves of the GPS satellites no longer reach).

In addition, the apparatus information transmission part 12 transmits the "location data of the monitoring band 1", which are the location coordinates obtained by the location information detection part 13 (the location coordinates of the monitoring band 1) to the smartphone 2, in addition to the "vital data" and the "remaining battery capacity data of the monitoring band 1".

Then, the smartphone 2 has the "location information detection part 21", the "relay part 22", the "smartphone information transmission part 23", and the "identification part 24" (see FIG. 4).

In addition, the relay part 22 is configured to be able to receive the transmission data (the "vital data", the "remaining battery capacity data of the monitoring pad 1", and the "location data of the monitoring pad 1") from the monitoring band 1, perform data formatting based on a predetermined data format, and transmit data to the server 3.

Here, like the first embodiment, the data formatting may also be performed by using a known or conventional process, and the data format is not particularly limited.

In addition, the smartphone information transmission part 23 transmits the "location data of the smartphone 2", which is the location coordinates (location coordinates of the smartphone 2) obtained by the location information detection part 21 and the "remaining battery capacity data of the smartphone 2" to the server 3.

Then, the server 3 is connected with the monitor 5, and has the "management part 31", the "display part 32", the "warning part 33", and the "control signal transmission part 34" (see FIG. 4).

Here, the management part 31 associates the monitored target identifier (not shown) and the band identifier (not shown), and determines monitoring data based on the "vital data". "remaining battery capacity data of the monitoring band 1", and "remaining battery capacity data of the smartphone 2" transmitted from the smartphone 2.

In addition, the warning part 33 alerts the monitoring person under the condition that the location data of the monitoring band 1 indicates a location outside the monitoring area.

In addition, in place of or in addition to the location data of the monitoring pad 1 indicating a location outside the monitoring area, the warning part 33 may also alert the monitoring person under the condition that the location data of the monitoring pad 1 indicates a location within a predetermined area.

[Effect]

In the monitoring band observation system Y applying the invention, like the monitoring band observation system X, since the vital data is transmitted to the server 3 via the smartphone 2 carried by the monitored target, the monitoring range (the range in which the warning part 33 can alert based on the location data of the monitoring band or the vital data) is expanded.

In addition, since the location information of the monitoring band 1 is also transmitted to the server 3, the location information can be expected to help during search for the monitored target.

3. MODIFIED EXAMPLE

Modified Example 1

In the second embodiment, the case where the smartphone 2 has the "location information detection part 21" is described as an example. However, since the monitored target can be monitored by learning the "location data of the monitoring band 1", it is not required that the smartphone 2 has the "location information detection part 21".

Modified Example 2

In the first embodiment and the second embodiment, the case where the monitored target is a "human being" is described as an example. However, the applicable target of the observation system of the invention is not limited to "human beings", but may also be "objects".

What is claimed is:

1. An observation system, comprising a predetermined apparatus, a server, and a relay device that is portable and relays communication between the apparatus and the server, wherein the apparatus comprises:

a sensor, obtaining predetermined observation information from an observation target to which the apparatus is mounted; and a first transceiver, transmitting the observation information obtained by the sensor and remaining battery capacity information of the apparatus to the relay device, wherein the relay device comprises:

a second transceiver, communicating with the apparatus and the server, wherein the second transceiver receives the observation information and the remaining battery capacity information of the apparatus from the apparatus, and wherein the second transceiver transmits the remaining battery capacity information of the apparatus and remaining battery capacity information of the relay device to the server, and wherein the server comprises a third transceiver transmitting a control signal controlling the apparatus to the apparatus via the relay device, and the server is configured to be able to transmit a caution signal to at least one of the apparatus or the relay device under a condition that a remaining battery capacity of the apparatus or a remaining battery capacity of the relay device is equal to or less than a predetermined reference value, wherein the caution signal indicates that the remaining battery capacity of at least one of the apparatus or the relay device is insufficient.

2. The observation system as claimed in claim 1, wherein the relay device further comprises a positional sensor, obtaining location information of the relay device, wherein the server is further configured to be able to display, on a management screen, that the location information of the relay device associated with the observation target is outside an observation area set in correspondence with the observation target under a condition that the location information is outside the observation area.

3. The observation system as claimed in claim 2, wherein the server is configured to be able to display, on the management screen, that the location information of the relay device is inside the observation area under a condition that the location information enters into the observation area from outside the observation area.

* * * * *